(12) United States Patent
Adams

(10) Patent No.: US 8,363,804 B1
(45) Date of Patent: Jan. 29, 2013

(54) PHONE CALL INTERRUPTION METHOD

(76) Inventor: Kieva R. Adams, Hapeville, GA (US)

( * ) Notice: Subject to any disclaimer, the term of this patent is extended or adjusted under 35 U.S.C. 154(b) by 174 days.

(21) Appl. No.: 12/905,183

(22) Filed: Oct. 15, 2010

(51) Int. Cl.
*H04M 3/42* (2006.01)

(52) U.S. Cl. .............................. 379/142.14; 379/373.02

(58) Field of Classification Search .............. 379/215.01
See application file for complete search history.

(56) References Cited

U.S. PATENT DOCUMENTS

| | | | |
|---|---|---|---|
| D348,673 S | 7/1994 | Jones, III et al. | |
| 5,812,649 A * | 9/1998 | Shen | 379/142.14 |
| 6,125,175 A | 9/2000 | Goldberg et al. | |
| 6,377,668 B1 * | 4/2002 | Smock et al. | 379/142.08 |
| 6,586,944 B1 | 7/2003 | Bugg | |
| 6,978,146 B1 | 12/2005 | Yardman | |
| 7,123,874 B1 | 10/2006 | Brennan | |
| 7,171,193 B2 | 1/2007 | Hoffman | |
| 7,530,876 B1 | 5/2009 | Wimberly | |
| 7,599,357 B1 * | 10/2009 | Croak et al. | 370/352 |
| 2003/0198323 A1 * | 10/2003 | Watanabe | 379/88.21 |
| 2004/0067769 A1 * | 4/2004 | King et al. | 455/556.1 |
| 2005/0172230 A1 * | 8/2005 | Burk et al. | 715/716 |
| 2005/0208931 A1 * | 9/2005 | Hoffman | 455/417 |

* cited by examiner

*Primary Examiner* — Creighton Smith

(57) ABSTRACT

A phone call interruption method includes a telephone that is engaged with a call. An audible disruptive sound is played adjacent to the telephone with a sound generating assembly. The call is then ended either after or while the disruptive sound is played.

4 Claims, 3 Drawing Sheets

PHONE CALL INTERRUPTION METHOD

BACKGROUND OF THE DISCLOSURE

Field of the Disclosure

The disclosure relates to sound generating devices and more particularly pertains to a new sound generating device for assisting a person in ending a phone conversation.

SUMMARY OF THE DISCLOSURE

An embodiment of the disclosure meets the needs presented above by generally comprising a telephone that is engaged with a call. An audible disruptive sound is played adjacent to the telephone with a sound generating assembly. The call is then ended either after or while the disruptive sound is played.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
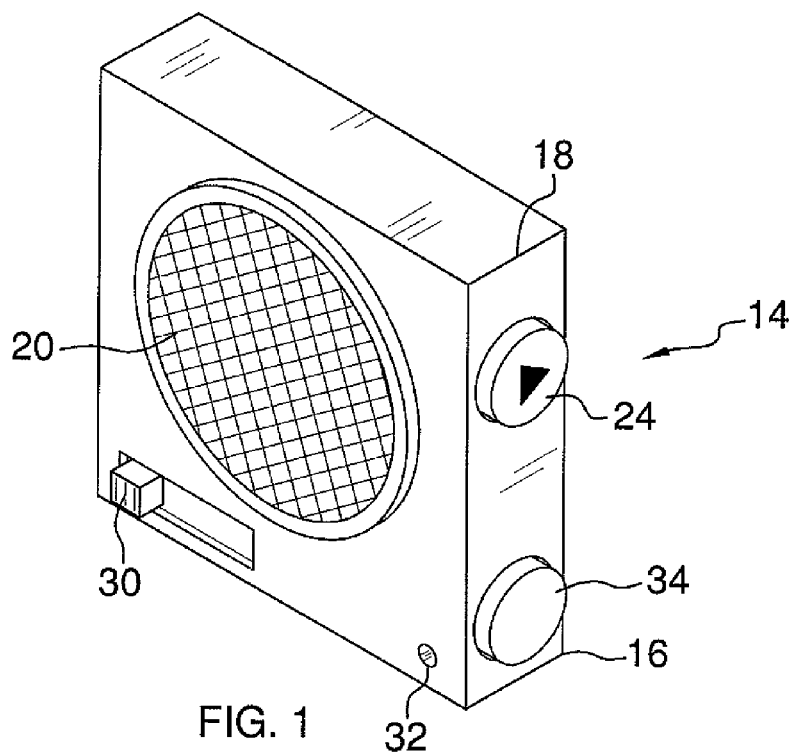
FIG. 1 is a front perspective view of a phone call interruption method according to an embodiment of the disclosure.
Figure 2:
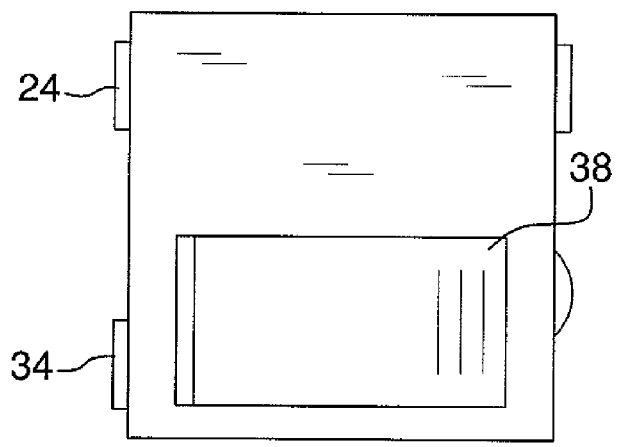
FIG. 2 is a back view of an embodiment of the disclosure.
Figure 3:
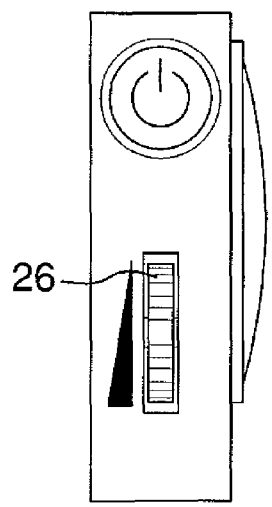
FIG. 3 is a side view of an embodiment of the disclosure.
Figure 4:
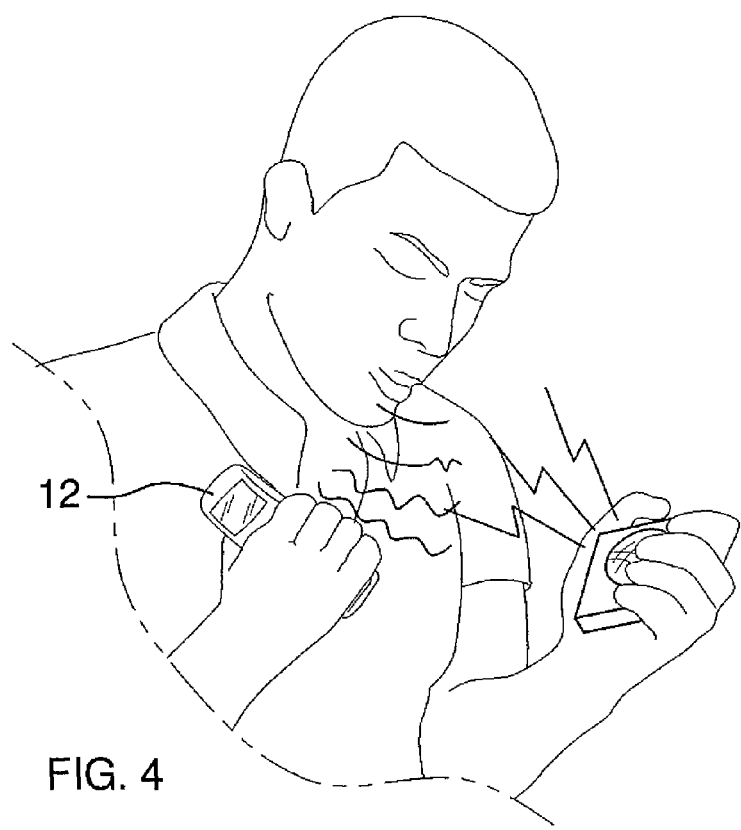
FIG. 4 is a perspective in-use view of an embodiment of the disclosure.

With reference now to the drawings, and in particular to FIGS. 1 through 6 thereof, a new sound generating device embodying the principles and concepts of an embodiment of the disclosure and generally designated by the reference numeral 10 will be described.

As best illustrated in FIGS. 1 through 6, the phone call interruption method 10 generally comprises providing a telephone 12 that is engaged with a call. The telephone 12 may be any conventional phone such as a wired phone, cordless phone, cellular phone and the like. The call may have been either initiated by the telephone 12 or another telephone calling the telephone 12.

During a conversation on the telephone 12, a person may play an audible disruptive sound adjacent to the telephone with a sound generating assembly 14. The term "disruptive" means either sounds that would make a listener to the sounds (i.e. the person on the other end of the call) believe that either the call connection is faulty or that the person using the telephone 12 must attend to another matter and end the call.

Figure 5:
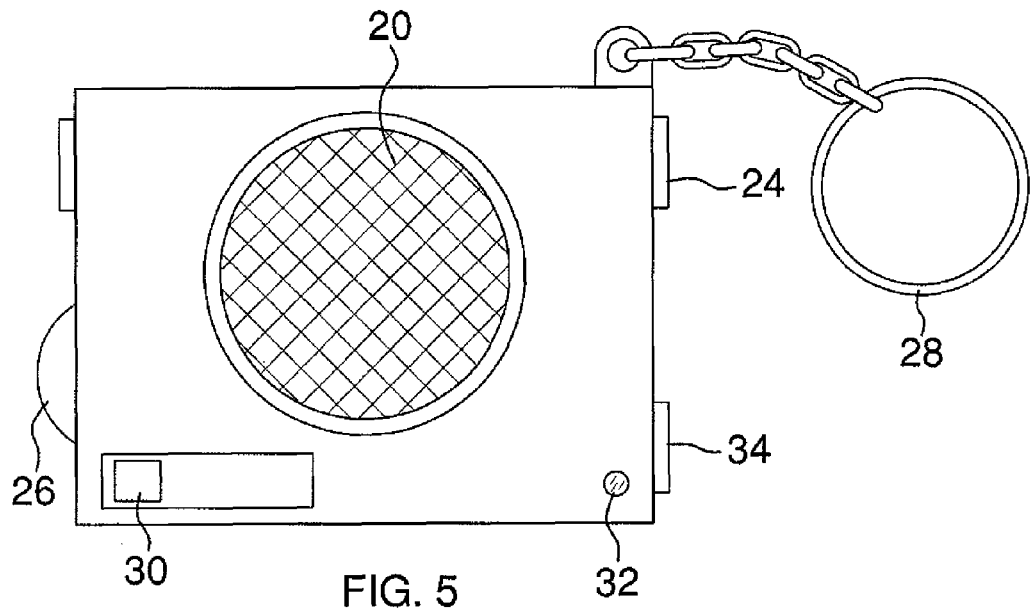
FIG. 5 is a front view of an embodiment of the disclosure.
Figure 6:
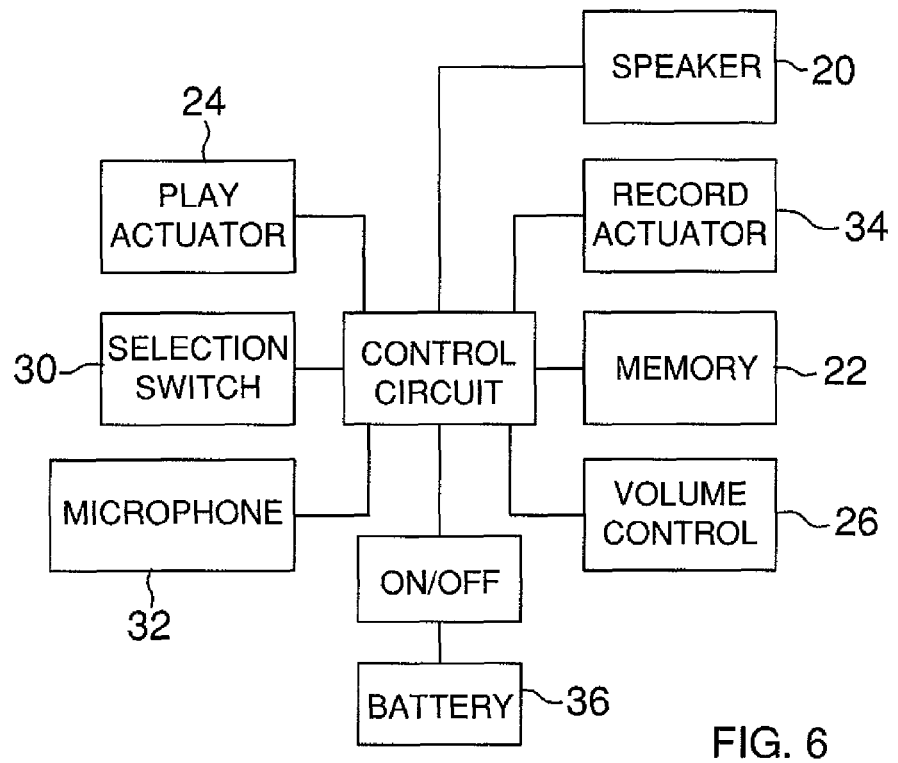
FIG. 6 is a schematic view of an embodiment of the disclosure.

The sound generating assembly 14 includes a housing 16 having a perimeter wall 18. A speaker 20 is mounted on the housing 16. An electronic memory 22 is mounted in the housing 16 and is electrically coupled to the speaker 20. The electronic memory 22 stores the disruptive sound. The disruptive sound may be selected from the group comprising a static sound such as that simulating electrical interference, an infant crying sound, a vehicle horn sound, an emergency vehicle siren sound, a knocking on wood sound, a doorbell sound, a call waiting sound, and a person's voice interruption sound. The person's voice interruption sound may, for example, be a male or female voice stating "excuse me" in an appropriate language. Alternatively, the disruptive sound may include ambient noises associated with a particular location. For instance, if the user wishes a listener to believe they are at a bowling alley, the disruptive sound would include ambient sounds associated with a bowling alley. This type of sound could allow the user to persuade the listener that they are located at a particular place, event or function. An actuator 24 is mounted on the housing 16 and is electrically coupled to the electronic memory 22. The electronic memory 22 audibly plays the disruptive sound with the speaker when the actuator 24 is actuated. A volume control 26 is mounted on the housing 16 and is electrically coupled to the speaker 20 to selectively alter a volume of the disruptive sound. A key ring 28 may be attached to the housing 16 as shown in FIG. 5 to allow the housing to be used to also hold a plurality of keys.

A selection switch 30 is mounted on the housing 16 and is electrically coupled to the electronic memory 22 to selectively chose one of a plurality of disruptive sounds stored on the electronic memory 22. A microphone 32 may be mounted on the housing 16 and be electrically coupled to the electronic memory 22 to allow new disruptive sounds to be recorded on the electronic memory 22 for later playback. A record actuator 34 is electrically coupled to the electronic memory 22 to actuate the electronic memory 22 and the microphone 32. The electronic memory 22 records sounds captured by the microphone 32 when the record actuator 34 is actuated. The sound generating assembly 14 is powered by a battery 36 mounted within the housing 16 and accessible through a panel 38 in the housing 16.

In use, when a person talking on the telephone 12 wishes to end the call for reasons such as excessive length of the call or the call is unpleasant, the person plays the disruptive sound and then ends the call using the disruptive sound as an excuse to end the call.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A method of interrupting a phone call, said method including the steps of:

providing a telephone being engaged with a call;
playing an audible disruptive sound adjacent to said telephone with a sound generating assembly;
ending said call after or while said disruptive sound is played; and
wherein said sound generating assembly comprises
   a housing having a perimeter wall,
   a speaker being mounted on said housing,
   an electronic memory being mounted in said housing and being electrically coupled to said speaker, said electronic memory storing said disruptive sound, said disruptive sound including a static sound simulating electrical interference, and
   an actuator being mounted on said housing and being electrically coupled to said electronic memory, said electronic memory audibly playing said disruptive sound with said speaker when said actuator is actuated.

2. A method of interrupting a phone call, said method including the steps of:
providing a telephone being engaged with a call;
playing an audible disruptive sound adjacent to said telephone with a sound generating assembly;
ending said call after or while said disruptive sound is played; and
wherein said sound generating assembly comprises
   a housing having a perimeter wall,
   a speaker being mounted on said housing,
   an electronic memory being mounted in said housing and being electrically coupled to said speaker, said electronic memory storing said disruptive sound,
   an actuator being mounted on said housing and being electrically coupled to said electronic memory, said electronic memory audibly playing said disruptive sound with said speaker when said actuator is actuated, and
   a selection switch being mounted on said housing and being electrically coupled to said electronic memory to selectively chose one of a plurality of disruptive sounds stored on said electronic memory.

3. The method of claim 2, wherein said sound generating assembly further comprises:
   a microphone being mounted on said housing and being electrically coupled to said electronic memory to allow new disruptive sounds to be recorded on said electronic memory for later playback; and
   a record actuator being electrically coupled to said electronic memory to actuate said electronic memory and said microphone, said electronic memory recording sounds captured by said microphone when said record actuator is actuated.

4. A method of interrupting a phone call, said method including the steps of:
providing a telephone being engaged with a call;
playing an audible disruptive sound adjacent to said telephone with a sound generating assembly, said sound generating assembly including;
   a housing having a perimeter wall;
   a speaker being mounted on said housing;
   an electronic memory being mounted in said housing and being electrically coupled to said speaker, said electronic memory storing said disruptive sound, said disruptive sound being selected from the group comprising a static sound simulating electrical interference, an infant crying sound, a vehicle horn sound, an emergency vehicle siren sound, a knocking on wood sound, a doorbell sound, a call waiting sound, and a person's voice interruption sound;
   an actuator being mounted on said housing and being electrically coupled to said electronic memory, said electronic memory audibly playing said disruptive sound with said speaker when said actuator is actuated;
   a volume control being mounted on said housing and being electrically coupled to said speaker to selectively alter a volume of said disruptive sound;
   a selection switch being mounted on said housing and being electrically coupled to said electronic memory to selectively chose one of a plurality of disruptive sounds stored on said electronic memory;
   a microphone being mounted on said housing and being electrically coupled to said electronic memory to allow new disruptive sounds to be recorded on said electronic memory for later playback;
   a record actuator being electrically coupled to said electronic memory to actuate said electronic memory and said microphone, said electronic memory recording sounds captured by said microphone when said record actuator is actuated;
   a key ring being attached to said housing; and
ending said call after or while said disruptive sound is played.

* * * * *